3,364,098
MOISTURE-PERMEABLE COMPOSITE
SHEET MATERIAL
Angelos V. Patsis, Newburgh, N.Y., assignor to E. I. du Pont de Nemours and Company, Wilmington, Del., a corporation of Delaware
No Drawing. Filed Mar. 27, 1964, Ser. No. 355,494
2 Claims. (Cl. 161—156)

ABSTRACT OF THE DISCLOSURE

A moisture-permeable sheet material is provided which (1) is useful as a shoe-upper material for ladies' shoes, (2) has unusually good surface smoothness when under tension as well as when relaxed, even when the product is relatively thin (e.g., up to about 35 mils in total thickness), and (3) is made up of (a) a porous substrate fabric, (b) a very specific type of nonwoven fabric of randomly-disposed fibers in superposed adherence with fabric (a), and (c) a mass of microporous moisture-permeable flexible polymeric composition which not only forms a smooth coating on fabric (b) but also penetrates the pores of fabrics (a) and (b) whereby the coating and the fabrics are integrally bonded together.

---

This invention concerns microporous, moisture-permeable composite leather-like sheet materials. It is known in the art that such sheet materials are sometimes referred to as "poromeric" materials. The poromeric material of the present invention is especially useful as a shoe-upper material for ladies' shoes.

One of the problems encountered during the lasting operation when forming shoes from material prepared by impregnating and coating fibrous substrates with polymeric materials is the development of roughness in those areas which require some stretching over the last such as in the toe and quarter areas of the shoe. Even when a non-woven web is used, this roughening is usually present and is associated with the pattern on the surface of the non-woven web prior to impregnation. In some instances roughening of man-made leather replacement materials has been diminished by using an interlayer fabric between the substrate and the coating thereon.

The problem of roughening is particularly difficult in the case of ladies' shoes because ladies' shoe uppers are substantially thinner than men's shoe uppers and conventionally do not exceed a total thickness of about 35 mils. This limitation on thickness precludes the possibility of utilizing an interlayer fabric such as cotton, wool and other conventional woven and non-woven fabrics because these are themselves so thick that when utilized with a satisfactory substrate and coated with a layer of poromeric material sufficient in thickness to hide the gross surface pattern of these fabrics, the composite structure is much too thick to be acceptable for ladies' shoes.

For example, a substrate fabric strong enough to provide a poromeric material having the strength and other physical properties required for shoe uppers will normally have a minimum thickness of about 22 mils. A woven cotton fabric of the type suitable for use as an interlayer will generally have a thickness of at least 6 mils. However, to provide a surface coating of a polymeric material sufficient to hide the surface pattern of the cotton interlayer material and to present an acceptable appearance will normally require a surface coating of polymeric material amounting to at least 13 mils thereby resulting in an overall thickness for the composite laminate of more than 41 mils. Such a material is too thick to be acceptable for ladies' shoes. Other conventional woven and non-woven fabrics are similarly unsuitable as interlayers in preparing poromeric products for ladies' shoe uppers.

In accordance with this invention, there is provided a poromeric sheet material suitable for ladies' shoe uppers and consisting essentially of a laminate containing two fibrous sheets, one a substrate fabric and the other an interlayer fabric, with a microporous polymeric material forming a continuous matrix within and connecting the interstices of the interlayer fabric and the interstices of the substrate fabric and terminating in a smooth microporous coating on the exterior surface of the interlayer, said laminate having superior non-roughening properties and high delamination tensile strength.

In accordance with this invention a non-roughening poromeric material is prepared using the polymer dispersions (including solutions) disclosed in U.S. 3,100,721 to Holden and in U.S. application Ser. No. 164,589, filed Jan. 5, 1962, by E. K. Holden (now U.S. Patent 3,208,-875). The entire disclosure of U.S. 3,100,721 and application Ser. No. 164,589 are hereby incorporated into and made a part of this specification for the purpose of illustrating materials and procedures useful in this invention.

The poromeric laminate of this invention is prepared by utilizing the procedures of the above patent and patent application and interposing a suitable interlayer fabric between the porous substrate sheet and the polymer dispersion coating under certain conditions set forth herein below and then coagulating and drying the coating.

The interlayer fabric preferred in this invention is a non-woven synthetic fabric which is preferably prepared by melt spinning from adjacent spinnerets polyethylene terephthalate fibers and copolyester fibers, the copolyester being an ethylene terephthalate-ethylene isophthalate copolymer. The copolymer fibers are lower melting than the polyethylene terephthalate fibers. During the spinning the freshly spun filaments are passed in rubbing contact with a suitable guide bar to give them an induced electrical charge. An aspirating air jet is also employed to attenuate and quench the filaments as well as to advance them to an aluminum plate receiver and deposit them in separate and random fashion in the form of a loosely constructed non-woven batt. The receiver is moved sufficiently to yield a batt of uniform thickness.

Next the batt is pressed at 5–20 p.s.i.g. and 110° C.–210° C. to consolidate it. Consolidation increases the density, strength and dimensional stability of the fabric. The consolidated product has the following characteristics: tensile strength 1–6×0.7–4 lbs./in., break elongation 10–40×20–60%, modulus 250–600×100–400 lbs./in.$^2$ at 5% elongation, thickness 2–6 mils, smoothness factor less than 10 mils, and weight 1.0–1.65 oz./sq. yd. It will be apparent from the present disclosure that the nonwoven fabric properties listed in the prior sentence are the properties of the fabric before being combined with the other components of the sheet material. Any non-woven web of synthetic fibers having these properties is suitable for use in this invention as an interlayer.

The novel poromeric sheet materials of this invention are prepared by applying sufficient polymeric dispersion to the interlayer sheet to form a smooth coating thereon and also to penetrate the thickness thereof. Conveniently a substrate fabric such as utilized in Example 1 of U.S. 3,100,721 is placed in contact with the lower surface of the interlayer material at the time the polymeric dispersion is applied but this need not be the case and in some instances better adhesion between the two fabric layers is obtained if the polymeric dispersion is applied to the interlayer fabric and allowed to penetrate the interlayer fabric and coat the opposite side thereof before being contacted with the substrate fabric. In any event it is essential that the substrate fabric and interlayer fabric be brought into close contact with each other possibly before or in any event after the dispersion is applied to the interlayer and that the polymeric dispersion be of suitable viscosity to penetrate the interstices of both fabrics to form a continuous matrix within and connecting the interstices of these fabrics and also forming a smooth coating on the exterior surface of the interlayer material. The manner of causing penetration of the interlayer and substrate by the polymer dispersion is not critical but application of suction beneath the substrate and/or the interlayer provides the most uniform penetration with the least disturbance of interlayer characteristics, and produces poromeric laminates having the best combination of non-roughening properties and delamination tensile strengths.

It is a particular advantage of this invention that poromeric materials may be produced having an overall thickness of about 35 mils in conjunction with a delamination tensile strength of at least 3 lbs./in. and a roughness value not exceeding one. Contributing to this result is the low smoothness factor of the interlayer materials utilized and the thinness and high strength of these materials despite their thinness. Thus the interlayers of this invention have a smoothness factor of less than about 10 mils by which is meant that when 10 mils (dry basic) of the polymeric dispersion utilized in Example 1 below is coated on the surface of one of these interlayer materials and dried, the surface pattern of the interlayer material is hidden (not discernible to the naked eye).

It is a primary requirement that the polymeric compound utilized in preparing the polymeric dispersions used in this invention have a maximum elastic deformation strength of at least about 100 and preferably about 130–300 pounds per square inch during the drying of the laminate as set forth below. This maximum elastic deformation strength generically specifies the polymer used in the process of this invention and also relates to all of the components used therein. The polymeric dispersion utilized in the invention is not critical and any polymeric dispersion may be utilized which can be converted to a uniformly microporous coriaceous sheet. All of the dispersions and solutions which can be used in preparing poromeric products disclosed in U.S. 3,100,721 to Holden and U.S. application Ser. No. 164,589, filed Jan. 5, 1962, by E. K. Holden are useful in this invention. The entire disclosures of U.S. 3,100,721 and the application Ser. No. 164,589 above are hereby incorporated into and made a part of this specification for the purpose of showing materials and procedures useful in this invention for preparing poromeric products.

*Example 1*

Utilizing as a substrate sheet material a porous impregnated (as described below) needle punched non-woven mat of 1.25 denier heat shrunk polyethylene terephthalate stable fibers a laminate is prepared utilizing this substrate and a non-woven interlayer fabric which is composed of poly(ethylene terephthalate) continuous filaments separately and randomly disposed within the fabric and prepared using an apparatus similar to that described in Example 2 of Belgian Patent 608,646.

The non-woven interlayer fabric was prepared by melt spinning poly(ethylene terephthalate) having a relative viscosity of about 34 into filaments from a 68 hole spinneret (7 mil hole diameter) while an 80/20 ethylene terephthalate/isophthalate copolymer was co-spun from an adjacent 34 hole spinneret. Thirteen grams of copolymer are spun for each 87 grams of poly(ethylene terephthalate). The freshly spun filaments are passed in rubbing contact with chromic oxide guide bars to give them an induced electrical charge. An aspirating air jet operating at 50 p.s.i.g. pressure is employed to attenuate and quench the filaments, advance them to an aluminum plate receiver and lay them down on the receiver in separate and random fashion in the form of a loosely constructed non-woven batt. The receiver is moved sufficiently to yield a batt of uniform thickness.

Next the batt is pressed together under a pressure of 7 p.s.i.g. at 160° C. to consolidate it. The consolidated fabric is denser and stronger than before but is still substantially entirely unbonded. The consolidated product has the following characteristics: tensile strength 3×2 lbs./in., break elongation 35%×55%, modulus 500×300 lbs./in.$^2$ at 5% elongation, thickness 5 mils, smoothness factor 5 mils, weight 1.6 oz./yd.$^2$. Thickness is determined by ASTM D–1813–60T.

The consolidated non-woven material used as interlayer has a smoothness factor of 5 mils, by which it is meant that as little as 5 mils (dry basis) of the colloidal dispersion utilized, when coated on the non-woven fabric and coagulated, washed and dried as above described, provides a smooth coating which to the naked eye is free from the surface pattern exhibited by the non-woven fabric prior to coating.

The consolidated fabric is placed on top of the substrate fabric and a polymer dispersion (12½% solids) in a dimethyl formamide/water mixture, prepared in accordance with Example 1 of U.S. 3,100,721 to Holden, is coated on the upper surface of the interlayer sheet in the amount of 3.75 pounds dispersion per square yard of surface coated. The coated structure is subjected to suction (5 inches of mercury vacuum) from the under side of the substrate layer for a few seconds which is sufficient to draw the polymeric dispersion through the interlayer material and partially into the substrate layer forming a continuous matrix connecting the two layers. (The non-woven fibrous substrate utilized had been previously impregnated with this polymer dispersion and then the impregnated material coagulated by bathing in water and dried so that the impregnated substrate contained 50% dispersion solids based on the weight of fibers.) The amount of suction and the length of time it is applied is regulated so that sufficient polymer dispersion remains on the upper side of the interlayer sheet to provide a coating about 8 mils thick after coagulation. About one-half minute after suction is released during which time the polymeric dispersion "flows out" and forms a smooth coating on the upper surface of the interlayer material the laminated structure is immersed in a tank which contains water at room temperature and is bathed in this water for about 3 minutes. Finally the product is immersed in another water bath at 35° C. until the polymer is completely coagulated. Residual solvent is leached from the product by further bathing in water and then the coated substrate is subjected to hot air at 121° C. for 7 minutes followed by drying at about 50° C. temperature. The polymeric coating is 8 mils thick and the resulting poromeric product is 35 mils thick with a roughness value of zero. Its adhesive strength between layers is 4.5 pounds per inch, and it has a leather permeability value of about 9000 (gms./hr./100 m.$^2$ at 21° C., 90% R.H., 3 hours; general method of Kanagy and Vickers, Journal of the Leather Chemists Association, 45, 211–242, Apr. 19, 1950).

Roughness values of poromeric materials are conventionally determined by Machine Model 1004–50B made by Columbia Vise and Manufacturing Company, Cleveland, Ohio. Using this machine the roughness value of the poromeric material produced in this example was zero and was determined by clamping a twelve inch square sample tightly between ring clamps, coating side up and distending the material upwards by a plano-convex deformation head to a maximum of 1 inch above the original plane. The head is moved by hydraulic pressure over a period of about 15 seconds. If there is no apparent roughness at the high point the roughness value is zero; if discernible but insignificant roughness is present the roughness value is 1; if more than insignificant roughness is apparent to the naked eye the roughness value is greater than 1.

The tensile strength of the adhesive bond between the interlayer and substrate is determined by taking a 1″ x 6″ sample and cutting it across the width sufficiently deep so that the interlayer can be separated from the substrate for a length of about 2 inches. The sample is then placed in an Instron tensile strength tester and the strength of the adhesive bond measured using a cross head speed of 10 inches per minute, a chart speed of 2 inches per minute and a jaw gap of 2 inches. The strength of the bond was found to be 4.5 pounds per inch.

Poromeric products prepared in accordance with this invention have roughness values not exceeding one, a minimum delamination bond strength (between coating and interlayer and also between interlayer and substrate) of 3 lbs./in., and a leather permeability value of at least 3000.

Tensile strength values expressed herein in the form — x — refer to tensile strengths of the fabric in the machine direction and width directions, measured by the strip method. Similar expressions with respect to other properties such as modulus and break elongation also refer to these directions of measurement.

I claim:
1. A moisture-permeable composite sheet material having good surface smoothness when relaxed and when under tension, and adapted for use as a breathable shoe-upper material for ladies' shoes, containing as essential components:
   (A) a porous non-woven substrate fabric,
   (B) a porous nonwoven fabric of randomly-disposed synthetic fibers in superposed adherence with fabric (A), and having (1) a thickness of about 2-6 mils, (2) a break elongation of about 10-40% x 20-60%, (3) a modulus of about 250-600 x 100-400 pounds per square inch at 5% elongation, (4) a tensile strength of about 1-6 x 0.7-4 pounds per inch, and (5) a smoothness factor of less than 10 mils, and
   (C) a mass of microporous moisture-permeable flexible polymeric composition which forms a smooth coating in superposed adherence with fabric (B), penetrates the pores of fabric (B), penetrates the pores of at least the uppermost portion of fabric (A) and integrally bonds the coating and fabrics (A) and (B) together.

2. A sheet material according to claim 1 wherein:
fabric (A) is a nonwoven fabric which has been impregnated throughout its thickness with a moisture-permeable flexible polymeric composition,
fabric (B) is made up of continuous poly(ethylene terephthalate) fibers randomly intermixed with continuous poly(ethylene terephthalate/isophthalate) fibers, at least some of the fibers being bonded to one another at their crossover points, and
the coating in superposed adherence with fabric (B) has a thickness of less than 10 mils and a roughness value of about 0-1.

References Cited

UNITED STATES PATENTS

| | | |
|---|---|---|
| 1,408,061 | 2/1922 | Arnold. |
| 3,046,171 | 7/1962 | Rogers _____ 161—264 |
| 3,067,482 | 12/1962 | Hollowell. |
| 3,100,721 | 8/1963 | Holden. |

ROBERT F. BURNETT, *Primary Examiner.*

ALEXANDER WYMAN, R. H. CRISS,
*Assistant Examiners.*